M. Leonard.
Making Coffins.
N°1,214. Patented July 2, 1839.
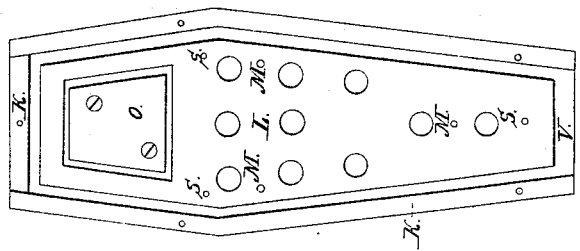
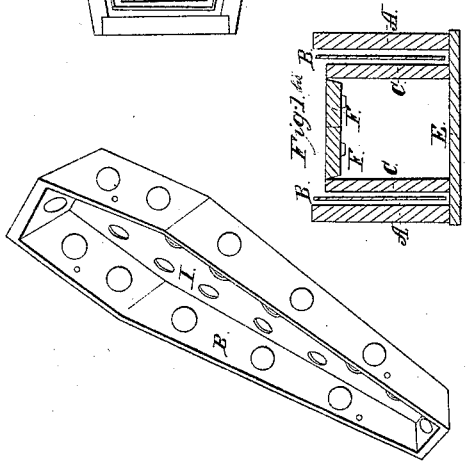

M. Leonard,
Making Coffins.
№ 1,214.   Patented July 2, 1839.
Sheet 2  2 Sheets.
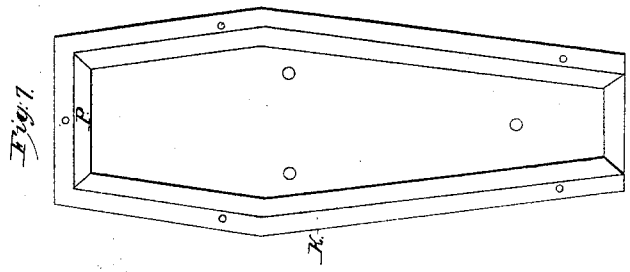
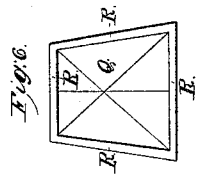 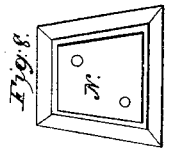
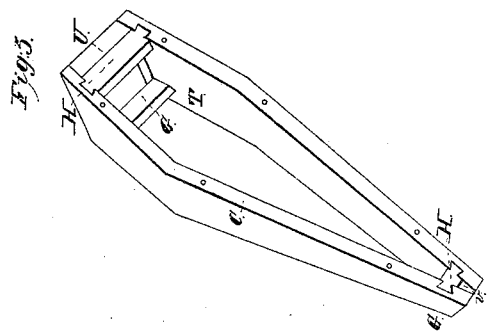

UNITED STATES PATENT OFFICE.

MOSES LEONARD, OF SYRACUSE, NEW YORK.

MODE OF MANUFACTURING CEMENT COFFINS.

Specification of Letters Patent No. 1,214, dated July 2, 1839.

*To all whom it may concern:*

Be it known that I, MOSES LEONARD, of the village of Syracuse, in the county of Onondaga and State of New York, have invented a new and improved mode of manufacturing or constructing coffins and other cases, or articles which it is desirable to protect from the influence of air and of moisture; and I do hereby declare that the following is a full and exact description thereof.

My improvement consists in the making of coffins, or other cases, or articles in part of wood, and in part of a cement, or composition, which is impervious to air and to moisture, and which will preserve the bodies, or other articles deposited therein, for an indefinite length of time.

As the same principles and mode of procedure is applicable to cases, or articles in other forms than that of coffins, a description of my mode of preparing the latter will apply equally to all others. In making a coffin I prepare a core, or shell, of thin boards, those of white pine, and of half an inch in thickness, answering the purpose perfectly well. This I cover, on both sides, with the water proof cement, or composition, to be presently described, leaving no part of the wood exposed, but coating the same throughout to the thickness of nearly half an inch, more or less, according to the size and nature of the article. Before applying the cement, or composition, I bore holes through the core or shell at suitable distances, which serve to bind together the cement, or composition on the opposite sides of the boards composing it.

The cement used by me is of the resinous kind, and is to be applied to the core, or shell, in a fused state. This cement may be varied as regards the ingredients employed, and the proportions in which they are combined, but the process and proportions which I am about to give have produced a cement which has answered well in practice, and will fully exemplify its nature and properties. Variations may also be made in the apparatus, or molds, used by me for casting the cement upon the core, but to enable others to carry my invention into effect, I will describe the mode of procedure which I have adopted, and have found to be efficient and convenient.

My cement, or composition, I make as follows: I take rosin, bees-wax, and pulverized stone, which I incorporate intimately by heat. The stone may be lime-stone, marble, granite, or any other of a suitable hardness and texture; the pulverized stone I prefer to make of different degrees of fineness, from that of corn-meal, to that of grains of buckwheat; to five pounds of rosin, and one pound of bees-wax I add about thirty pounds of the pulverized stone, first melting the rosin and bees-wax in an iron vessel over a fire, and then stirring in the pulverized stone, previously sifted; and these ingredients, in these proportions, or nearly so, will constitute a cement, or bituminous artificial stone which, while it may be fused and cast into molds, will when cold, be extremely hard and tough, and be perfectly impervious to air and moisture. When this composition is to be used in making a coffin, I prepare the molds requisite for the purpose, and proceed in other respects in the following manner, as illustrated by the accompanying drawings, in which—

Figure 1, is a top view of the mold, containing the core, or shell, so placed within the mold as to admit of the application of the cement with which it is to be covered. Fig. 2, shows the core, with the exception of that part which is to form the lid. Fig. 3, shows a part of the mold for coating the lid, with the lid inserted within it.

The mold consists principally of an outer and inner case, so proportioned to each other that the core may be placed between them, while a space is still allowed between the core and the outer and inner portions of the mold for pouring in the cement, and for determining its thickness.

In Fig. 1, A, A, shows the edge of the outside case, or mold, made in the form of a coffin, but without a bottom. B, is the core, or shell placed within it and, like the outside mold, being without a bottom, but consisting only of the sides and ends. C, is the inner portion of the mold, and like A, and B, has no bottom. When these molds are to be used I place them one within the other, as shown in Fig. 1, and to preserve them in the proper relative situations I pass iron bolts D, D, through holes prepared for the purpose in the molds A, and C, and also in the core B, taking care that an equal space is left for the cement all around the core; which space is shown by the back lines in the figure. The core B, is not placed flush with the cases A, and C, but with its edge receding about three eighths, or half, of an inch, that the cement may cover it to this depth. When the casting of the cement is to be effected the cases are to be turned bottom upward, a lid being first placed on which will fit closely to the edges of the two molds. In Fig. 1, we will suppose it to stand in this inverted position, when E, which is the lid last spoken of, will constitute the bottom of the mold; in this position the edges of A, A, are to be about $1\frac{1}{4}$ inch above the edge of the core, and the latter about three eighths of an inch above the inner mold C, which will admit of the proper thickness of the cement, and of the insertion of the bottom board. This is distinctly shown in Fig. 1, viz. which is a section through Fig. 1, at the place of the dotted line $a, b$.

F, F, Fig. 4, are two pieces which are to be placed within the case C, their ends resting on the ledges G, G; the inner edges of the pieces F, F, are beveled for the purpose of drawing them out easily after the casting of the cement; for drawing them out a suitable handle, or handles, is affixed to each of them.

The particular manner in which I construct the inner case C, is shown in Fig. 5. It has two cross bars G, G, at the top, and two H, H, at the bottom, to hold the sides firmly and still to admit of its being taken apart. The bottom bars H H, are dovetailed to the sides; and the ends of the top bars G, G, are set in notched beveled grooves T. All the parts of the mold with which the cement is to come into contact in casting, I cover with metal, as with sheet tin, or zinc, and anoint these parts with tallow, or other suitable article to prevent the adhesion of the cement.

Having prepared my mold for casting I proceed as follows: The cement being properly fused I pour it in on each side of the core B, which is to remain inclosed therein as a part of the walls of the coffin; at the time of pouring an assistant is provided with an iron paddle, heated nearly to redness, to tamp and combine the cement, and to distribute it equally. When the composition rises half an inch from the core B, it having covered the top of the second case C, I then place on a board which is to be inclosed by the cement, and forms the core of the bottom of the coffin. This board is marked I, in Fig. 2, where it is shown in contact with the core of the sides and ends, to which, however, it is not attached. This board I press down upon the cement so as to bring it into perfect contact therewith. I again pour on the cement so as to cover said board, heating, tamping, and leveling off the cement as may be found requisite. The cement will then be even with the edge of the case A. To remove the mold from the coffin I turn it so as to have the right side up, unscrew the top E, which had been so secured to the edges of A and C, draw out the iron bolts D, D, take out the bottom dovetailed bars H, H, and the bars G, G; then draw out the end pieces U, U, of the inner case C; take out the pieces F, F, and then remove the side pieces of C, and unscrew, and take off the parts of the outer case A, A, which are connected by screws for that purpose. Upon the same principle I make a mold for the lid of the coffin, which has a wooden core, and is finished in all respects like the other part. I sometimes make provision for inserting a pane of glass in the lid, the mold and core being in that case so modified as to admit of this being done.

Fig. 3 shows a part of the mold of the lid, with the core placed within it. The best mode of casting the cement for the lid is to place the mold erect, with one end uppermost. In the drawing the end V is shown as left open for that purpose; the other end may be let through the floor, or into the ground, to bring it to a convenient height; in casting this the tamping iron is to be used as before directed. In the lid mold, Fig. 3, K, K, are the edges of the hollow case; L, the core placed within it. In each end of the core L I insert pins M, M, to keep it equidistant from the sides of the mold; and iron pins are let through both sides of the mold, and through the core, as at S, S, S, to keep the edges of the core equidistant from the mold. When a pane of glass is to be inserted, a portion of the core is cut away, and a piece of wood O, is secured by screws to the mold, said piece being so formed as to produce the proper cavity.

After the coffin has been removed from the mold, should there be any cavities, or defective parts, they may be readily filled, or made perfect by the addition of a portion of this cement, and the use of a hot iron. The surface of the whole coffin may be polished, and will then have a very handsome appearance; or it may be painted, or otherwise ornamented.

The lid is to be fastened on so as to make the whole coffin one continuous piece, leaving no cavities for the infiltration of moisture, or the passage of air. This may be effected by passing screws through the lid, so as to enter the core within the body of the coffin, the heads of the screws being sunk in the lid, and finally covered by melted cement. The joint, or space between the lid and the body of the coffin is then to be treated by fusing the contiguous portions of cement by means of suitable heated irons, with the addition of a portion of fresh cement to make the whole perfect, and to allow of the dressing off and polishing, or otherwise finishing this part in the same manner with the other portions of the coffin. To prepare the coffin for affixing the lid to it, I generally chamfer off the upper edge, so as to allow of space for pouring in fresh cement, and by so doing the operation is much facilitated. The holes left by the iron bolts D, D, serve for the insertion of handles, which are to be secured by cementing. I cut out a place to screw on the nut on the inside, and pour in a portion of the composition so as perfectly to cover the end of the screw, which, were it possible for the screws to become loose, would still prevent the passage of air or moisture.

Having thus fully described the nature of my invention, and the manner in which the same is to be carried into operation, what I claim as my invention, and desire to secure by Letters Patent, is—

1. The within described mode of manufacturing or constructing coffins, or other cases, or articles which it is desirable to protect from the influence of air and of moisture; that is to say, the making of such coffins, or cases, with a core of wood, covered, or enveloped on all sides with a fusible resinous cement, of the kind, or having the properties, of that the composition of which is herein set forth.

2. I also claim the particular manner herein described of forming, or constructing the molds in which the core is to be placed for the purpose of casting the cement around them. It is to be understood, however, that, although I claim the particular manner herein described of constructing the molds, my first claim, to the manner of constructing coffins, or other cases, is made without reference to the particular mode of forming the molds, as a core of wood may be enveloped in cement, and a similar coffin or case made by other modes of procedure; and the so constructing of coffins, or other cases, I believe to be an entirely new invention.

MOSES LEONARD.

Witnesses:
CLEMENT T. COOTE,
WM. WALLIS.